United States Patent
Masumi et al.

(10) Patent No.: US 7,304,095 B2
(45) Date of Patent: *Dec. 4, 2007

(54) PHOTOCURABLE INK-JET INK, INK-JET IMAGE FORMING METHOD AND INK-JET RECORDING APPARATUS USING THE SAME

(75) Inventors: Satoshi Masumi, Odawara (JP); Daisuke Ishibashi, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 338 days.

This patent is subject to a terminal disclaimer.

(21) Appl. No.: 11/016,177

(22) Filed: Dec. 17, 2004

(65) Prior Publication Data

US 2005/0140765 A1    Jun. 30, 2005

(30) Foreign Application Priority Data

Dec. 26, 2003    (JP)    ............... 2003-432861

(51) Int. Cl.
   C08F 2/50    (2006.01)
   C09D 11/02    (2006.01)
   C09D 4/02    (2006.01)

(52) U.S. Cl. ............... 522/81; 522/74; 522/75; 522/90; 522/96; 522/100; 522/104; 522/107; 522/150; 522/151; 522/152; 522/153; 522/173; 522/174; 522/175; 522/178; 522/181; 522/182; 106/31.13; 106/36; 106/31.65; 106/31.85; 106/31.89; 106/31.9; 106/400; 106/401

(58) Field of Classification Search ............... 522/74, 522/75, 81, 90, 96, 100, 104, 107, 150, 151, 522/152, 153, 173, 174, 175, 178, 181, 182; 106/31.13, 31.6, 31.65, 31.85, 31.89, 31.9, 106/400, 401

See application file for complete search history.

(56) References Cited

U.S. PATENT DOCUMENTS

| 5,952,401 | A  | * | 9/1999  | Kimura et al. ............... 523/161 |
| 6,145,979 | A  | * | 11/2000 | Caiger et al. ............... 347/102 |
| 6,540,344 | B2 | * | 4/2003  | Kashiwazaki et al. ...... 347/100 |
| 6,627,696 | B1 | * | 9/2003  | Takao et al. ................. 524/588 |
| 6,900,253 | B2 | * | 5/2005  | Takao et al. ................. 523/160 |
| 6,936,657 | B2 | * | 8/2005  | Takao et al. ................. 524/588 |
| 2002/0041317 | A1 | * | 4/2002 | Kashiwazaki et al. ...... 347/100 |
| 2002/0077383 | A1 | * | 6/2002 | Takao et al. ................. 523/160 |
| 2004/0244622 | A1 | * | 12/2004 | Ichinose et al. ............ 101/491 |
| 2004/0266911 | A1 | * | 12/2004 | Aida et al. .................... 523/160 |
| 2005/0043434 | A1 | * | 2/2005 | Ichinose et al. ............ 523/160 |
| 2006/0052473 | A1 | * | 3/2006 | Takabayashi ................ 522/71 |
| 2006/0089424 | A1 | * | 4/2006 | Sanada et al. ............... 523/160 |

FOREIGN PATENT DOCUMENTS

| JP | 06-200204   | * | 7/1994 |
| JP | 11-140356   | * | 5/1999 |
| JP | 2000-504778 | * | 4/2000 |
| JP | 2000-204305 | * | 7/2000 |
| JP | 2002-060463 | * | 2/2002 |
| JP | 2002-188025 | * | 7/2002 |
| JP | 2003-252979 | * | 9/2003 |

* cited by examiner

Primary Examiner—Sanza L. McClendon
(74) Attorney, Agent, or Firm—Lucas & Mercanti, LLP (57) ABSTRACT

A photocurable ink for ink-jet printing, including: a photopolymerizable compound; a pigment; and a dispersing agent, wherein the photopolymerizable compound is a radical polymerizable compound; an amine value of the pigment (AMp) is larger than an acid value of the pigment (ACp); and an acid value of the dispersing agent (ACd) is larger than an amine value of the dispersing agent (AMd).

8 Claims, 2 Drawing Sheets

PHOTOCURABLE INK-JET INK, INK-JET IMAGE FORMING METHOD AND INK-JET RECORDING APPARATUS USING THE SAME

FIELD OF THE INVENTION

The present invention relates to a photocurable ink (or called as an actinic radiation curable ink) for ink-jet printing capable of stably reproducing highly detailed images on various recording materials, as well as an image forming method and an ink-jet recording apparatus using the same.

BACKGROUND OF THE INVENTION

In recent years, ink-jet recording systems have been applied to various printing fields such as photography, various kinds of printing, graphic marking, and special printing such as color filters, since they make it possible to simply and conveniently produce images at low cost. Specifically, by employing ink-jet recording apparatuses which eject minute ink droplets and control them, ink-jet inks which result in a wider range of color reproduction, greater durability as well as higher ejection adaptability, and special paper sheets of which ink absorbability, color forming properties of colorants and surface glossiness are markedly improved, it has become possible to result in image quality comparable to conventional silver salt photography. Improvement in image quality of the current ink-jet recording systems have been achieved only by integration of ink-jet recording apparatuses, ink-jet inks and specialized kinds of paper.

However, in ink-jet systems which necessitate specialized paper, problems surface in which recording media are limited and the cost of the recording media increases. Consequently, a number of trials have been conducted in which recording is performed on media to be deposited, which are different from typical specialized kinds of paper. Listed as specific examples of these kinds of paper are a phase variation ink-jet system which employs a wax ink which is a solid at room temperature, a solvent based ink-jet system which employs an ink composed of rapid drying organic solvents as a major component, and an ultraviolet radiation curable ink-jet system in which crosslinking is performed employing actinic radiation such as ultraviolet radiation (hereinafter referred to as UV radiation).

In recent years, of these systems, the actinic radiation curable ink-jet system has received favorable attention due to its relatively low unpleasant odor and also to its rapid drying properties capable of performing recording on non-ink absorptive recording media, compared to solvent based ink-jet systems, and a number of UV radiation curable ink-jet inks are disclosed (refer, for example, to Patent Documents 1-6).

In view of fastness of formed images, frequently employed is an ink which is produced by dispersing pigments as a major component.

A common, but major problem in achieving stable dispersion characteristics during pigment dispersion is how pigments are adsorbed onto dispersing agents. When polar solvents are used, non-polar interaction is utilized, while when non-polar solvents are employed, polar intersection is utilized. For example, when water-based solvents are used, non-polar interaction is utilized, while when non-poplar solvents are employed, polar interaction is utilized.

Of these, during dispersion of solvent-based pigments, it is proposed to the use acid-base concept. Namely, when pigments are acidic, basic dispersing agents are employed, while when pigments are basic, acidic dispersing agents are used. From such a viewpoint, a number of proposals have been made in which characteristics of employed dispersing agents are specified (refer, for example, to Patent Documents 3 as well as 7-10). However, nothing has yet described with regard to oxidation of dispersing agents used for pigment dispersion, amine value, and characteristics of pigments which are dispersoid used in combination.

Generally, an actinic radiation curable (or a photocurable) ink-jet ink, though it is a solvent based system, is a system which makes it difficult to achieve the desired adsorption between pigments and dispersing agents due to the presence of polar groups derived from polymerizable groups. In ink-jet inks, poor dispersibility of pigments results in critical problems, compared to that of conventional pigments. An ink-jet recording system is a recording system in which liquid droplets containing pigment particles are ejected at a high rate from minute nozzles. Consequently, when dispersion is unstable, such unstable ejection results in critical problems. As a result, it is essential to select appropriate dispersing agents for employed pigments. However, no method has been discovered which overcomes the above problems.

(Patent Document 1) Japanese Patent Publication Open to Public Inspection (hereinafter referred to as JP-A) No. 2002-179967
(Patent Document 2) JP-A No. 2002-241654
(Patent Document 3) JP-A No. 2002-348478
(Patent Document 4) JP-A No. 2003-147233
(Patent Document 5) JP-A No. 2003-253155
(Patent Document 6) JP-A No. 2003-55563
(Patent Document 7) JP-A No. 5-262808
(Patent Document 8) JP-A No. 8-38875
(Patent Document 9) JP-A No. 2003-128966

SUMMARY OF THE INVENTION

In view of the foregoing problems, the present invention was achieved. An object of the present invention is to provide an actinic radiation curable ink-jet ink which exhibits excellent dispersion stability as well as excellent ejection stability and a recording method, as well as a recording apparatus capable of achieving stable reproduction of highly detailed images, employing the same.

The above-mentioned object of the present invention is accomplished by a photocurable ink for ink-jet printing, including:
a photopolymerizable compound;
a pigment; and
a dispersing agent,
wherein the photopolymerizable compound is a radical polymerizable compound;
an amine value of the pigment (AMp) and an acid value of the pigment (ACp) is adjusted to satisfy a predetermined relationship; and
an acid value of the dispersing agent (ACd) and an amine value of the dispersing agent (AMd) is adjusted to satisfy a predetermined relationship.

DESCRIPTION OF THE PREFERRED EMBODIMENTS

Preferred embodiments of the present invention have the structures described below.

(1) A photocurable ink for ink-jet printing, comprising:
 a photopolymerizable compound;
 a pigment; and
 a dispersing agent,
 wherein the photopolymerizable compound is a radical polymerizable compound;
 an amine value of the pigment (AMp) is larger than an acid value of the pigment (ACp); and
 an acid value of the dispersing agent (ACd) is larger than an amine value of the dispersing agent (AMd).

(2) The photocurable ink for ink-jet printing of Item 1, wherein the amine value of the pigment (AMp), the acid value of the pigment (ACp), the acid value of the dispersing agent (ACd) and the amine value of the dispersing agent (AMd) satisfy the following relationship:

$1 \leq AMp-ACp<10$; and $1 \leq ACd-AMd<30$.

(3) The photocurable ink for ink-jet printing of Item 1, wherein an amount of the dispersing agent comprised in the photocurable ink is 20 to 80 weight % based on the total weight of the pigment.

(4) The photocurable ink for ink-jet printing of Item 2, wherein an amount of the dispersing agent comprised in the photocurable ink is 20 to 80 weight % based on the total weight of the pigment.

(5) A method of forming an image comprising the steps of:
 jetting droplets of the photocurable ink of any one of Items 1-4 from a plurality of nozzles of an ink-jet head onto a recording material; and
 irradiating the jetted droplets of the photocurable ink on the recording material with active rays so as to harden the photocurable ink,
 wherein the irradiating step is carried out within 0.001 and 1.0 second after arrival of the droplets of the photocurable ink onto the recording media.

(6) A method of forming an image comprising the steps of:
 jetting droplets of the photocurable ink of any one of Items 1-4 from a plurality of nozzles of an ink-jet head onto a recording material; and
 irradiating the jetted droplets of the photocurable ink on the recording material with active rays so as to harden the photocurable ink,
 wherein a thickness of the hardened ink is from 2 to 25 µm.

(7) A method of forming an image comprising the steps of:
 jetting droplets of the photocurable ink of any one of Items 1-4 from a plurality of nozzles of an ink-jet head onto a recording material; and
 irradiating the jetted droplets of the photocurable ink on the recording material with active rays so as to harden the photocurable ink,
 wherein the ink-jet head is a line head.

(8) An apparatus for ink-jet recording using the method of any one of Items 5 to 7, comprising an ink-jet head having a plurality of nozzles for jetting a photocurable ink onto a recording material,
 wherein the ink and the ink-jet head are heated at 35 to 100° C. prior to carrying out the jetting step,
 wherein the ink-jet head is heated at 35 to 100° C. prior to carrying out the jetting step.

Based on the present invention, it is possible to provide an actinic radiation curable ink which exhibits excellent dispersion stability, as well as ejection stability, and a recording method and an apparatus capable of reproducing highly detailed images on various recording materials using the same.

The optimal embodiments to practice the present invention will now be detailed. However, the present invention is not limited thereto.

The inventors of the present invention performed diligent investigations to overcome the above problems and discovered that in an actinic radiation curable ink-jet ink incorporating photopolymerizable compounds, which were radically polymerizable compounds, pigments and dispersing agents, the problems were overcome by employing an actinic radiation curable ink-jet ink which was prepared by employing dispersing agents at an acid value greater than their amine value, or an actinic radiation curable ink-jet ink which was prepared by employing pigments at an amine value greater then their acidic value.

Heretofore, it has been well known that basic dispersing agents are employed during dispersion of pigments. The inventors of the present invention further investigated dispersibility and dispersion stability of pigments. As a result, it was possible to discover no dispersion method which resulted in desired dispersion usable for actinic radiation curable ink-jet inks. Therefore, the inventors of the present invention performed further diligent investigations. As a result, it was possible to overcome the aforesaid problems by employing either acidic dispersing agents as a dispersing agent or basic pigments as a pigment, whereby it was possible to obtain actinic radiation curable ink-jet inks in spite of resulting in markedly high dispersion stability.

The present invention will now be detailed.

In the actinic radiation curable ink-jet ink (hereinafter occasionally referred simply to as the ink of the present invention) of the present invention, features are that as a dispersing agent, those at an acidic value greater than their amine value may be used.

The acid value or the amine value, as described in the present invention, can be determined employing potentiometric titration. For example, it is possible to determine any of them employing the method described in Shikizai Kyokaishi (Journal of the Japan Society of Colour Material) 61, (12) 692-698 (1988). In the case in which a plurality of pigments and dispersing agents are employed, it is possible to designate the value by utilizing their weight average.

In the ink of the present invention, it is preferable that the acid value of dispersing agents is greater than their amine value. The difference between them is preferably 1-30 mg/g KOH. When that difference between the acid value and the amine value is less than 1 mg/g KOH, it is not possible to achieve the targeted effects, while when it is at least 30 mg/g KOH, it is a concern that thermal reaction undergoes to result in curing.

Dispersing agents usable in the present invention are not particularly limited as long as conditions specified by the present invention are satisfied, and either low or high molecular weight dispersing agents may be employed. Of these, high molecular weight dispersing agents are preferred. Specific examples of preferred dispersing agents include Ajisper PB822 and PB821, produced by Ajinomoto Fine Techno Co. Of course, the present invention is not limited thereto.

An amount of the dispersing agent comprised in the photocurable ink is preferably in the range of from 20 to 80 weight % based on the total weight of the pigment.

In the present invention, it is preferable that along with the aforesaid dispersing agents, selected as a pigment, being a dispersoid, are those at an amine value greater than their acid value. Further, the difference between the amine value and the acid value is preferably 1-10 mg/g KOH. When the difference between the amine value and the acid value is less than 1 mg/g KOH, it is not possible to obtain the targeted effects of the present invention, while when it is at least 10 mg/g KOH, it is necessary to perform excessively basic treatments, resulting in an increase in cost. As a result, neither case is preferred.

Employed as pigments usable in the present invention may be various pigments, as long as their amine value is greater than their acid value.

Specific examples of pigments usable in the present invention will now be listed below. Of the pigments listed below, it is possible to use those at a greater amine value than their acid value, however, the present invention is not limited thereto.

<C.I. Pigment Yellow>
 1, 2, 3, 12, 13, 14, 16, 17, 73, 74, 75, 81, 83, 87, 93, 95, 97, 98, 109, 114, 120, 128, 129, 138, 139, 150, 151, 154, 180 and 185

<C.I. Pigment Red>
 5, 7, 12, 22, 31, 38, 48:1, 48:2, 48:4, 49:1, 53:1, 57:1, 63:1, 101, 112, 122, 123, 144, 146, 147, 150, 166, 168, 170, 177, 184, 185, 202, 238 and 249

<C.I. Pigment Violet>
 19 and 23

<C.I. Pigment Blue>
 1, 2, 3, 15:1, 15:2, 15:3, 15:4, 18, 22, 27, 29, and 60

<C.I. Pigment Green>
 7 and 36

<C.I. Pigment White>
 6, 18, and 21

<C.I. Pigment Black>
 7

If desired, the pigments employed in the present invention may be subjected to various prior art surface treatments.

In order to disperse the aforesaid pigments, employed may, for example, be a ball mill, a sand mill, an attritor, a roller mill, an agitator, a Henschel mixer, a colloid mill, an ultrasonic homogenizer, a pearl mill, a wet system jet mill, and a paint shaker. Further, if desired, employed as dispersing aids may be synergists corresponding to each of the various types of pigments. These dispersing agents and dispersing aids are preferably added in an amount of 1-50 parts by weight per 100 parts by weight of the pigments. Solvents or polymerizable compounds are employed as a dispersing medium. In the ink of the present invention, since reaction and curing are performed by exposure to actinic radiation immediately after deposition of ink droplets, it is preferable that no solvent is employed. When solvent remains after curing the images, solvent resistance is degraded and problems of VOC of the remaining solvents occur. Consequently, in view of dispersion adaptability, it is preferable that dispersing media are not solvents but polymerizable compounds, of these, monomers having the lowest viscosity of these, are selected.

Pigments are preferably dispersed to form particles at an average diameter of 0.08-0.5 µm. Further, pigments, dispersing agents, and dispersing media are selected, as well as dispersing conditions and filtering conditions are set, so that the maximum particle diameter is in the range of 0.3-10 µm and preferably 0.3-3 µm. By performing such particle diameter management, it is possible to minimize clogging of head nozzles, and to maintain the storage stability, transparency, and curing rate of the ink.

The concentration of pigment is preferably 1-20 percent by weight with respect to the weight of the total composition.

It is possible to use the inks of the present invention to prepare an ink-jet ink set composed of at least a yellow ink-jet ink, a magenta ink-jet ink, a cyan ink-jet ink, and a black ink-jet ink, whereby it is possible to prepare an ink-jet ink set including a plurality of inks, which are commonly employed to prepare so-called color ink-jet prints.

Further, in order to form photographic images employing an ink-jet, it is possible to employ so-called light and dark ink prepared by varying the content of each of the colorants. Further, if desired, it is preferable to use ink tinted with specific colors such as red, green blue or white.

In the present invention, in order to secure dispersion stability, it is necessary to select dispersing agents and/or pigments, each exhibiting the acid value/the amine value specified by the present invention. When dispersion stability is insufficient, clogging of recording head nozzles is generated due to sedimentation and structural viscosity. In ink-jet recording, generation of the structural viscosity results in an increase in ink viscosity during intermittent ejection. As a result, problematic ejection is generated due to a decrease in ejection rate. Specifically, at a low ejection rate, in an ink-jet recording apparatus employing a carriage, during return of the carriage during interactive printing, the viscosity of the ink increases and the ejection rate is lowered, whereby the intended deposited ink droplet position is shifted. Further, in the case of line head printing, the deposition position of ink which has continuously ejected from a nozzle is deviated from the deposition position of ink droplets ejected from a nozzle which has been not been used for printing.

The ink of the present invention is characterized in that radically polymerizable compounds are used as a photopolymerizable compound.

Radically polymerizable compounds employed in the ink of the present invention are those having an ethylenic unsaturated bond. Any compounds are acceptable as long as they are compounds having at least one radically polymerizable unsaturated bond in the molecule. Examples include compounds in the form of monomers, oligomers, or polymers. The radically polymerizable compounds may be employed singly or in combinations of at least two types at any appropriate ratio which improves the targeted characteristics.

Listed as examples of radically polymerizable ethylenic unsaturated compounds are unsaturated carboxylic acids such as acrylic acid, methacrylic aid, itaconic acid, crotonic acid, isocrotonic acid, or maleic acid and salts thereof; esters, urethane, amides and anhydrides thereof; acrylonitrile, and styrene; as well as radically polymerizable compounds such as various unsaturated polyesters, unsaturated polyethers, unsaturated polyamides, or unsaturated urethanes.

Specific examples include acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, pentaerythritol triacrylate, benzyl acrylate, bis(4-acryloxypolyethoxyphenyl)propane, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, dipentaerythritol tetraacrylate, pentaerythritol tetraacrylate, trimethylolpropane acrylate, tetramethylolmethane tetraacrylate, oligoester acrylate, N-methylolacrylamide, diacetone acrylamide, or epoxyacrylate; methacryl derivatives such as methyl methacrylate, n-butyl methacrylate, 2-ethylhexyl methacrylate, lauryl methacrylate, allyl methacrylate, glycidyl methacrylate, benzyl methacrylate, dimethyl aminomethacrylate, 1,6-hexanediol methacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate, or 2,2-(bis(4-methacryloxypolyethoxyphenyl))propane; and derivatives of allyl compounds such as allyl glycidyl ether, diallyl phthalate, or triallyl trimellitate. Further, it is possible to use commercially available products, described in "Kakyozai Handbook (Crosslinking Agent Handbook), edited by Shinzo Yamashita (1981, Taisei Sha), "UV·EB Koka Handbook (Genryo Hen) (UV·EB Curing Handbook (Raw Material Part))", edited by Kiyonori Kato (1985, Kobunshi Kanko Kai), "UV·EB Koka Gijutsu no Oyo to Shijo (Application of UV•EB Curing Technology and Its Market)", edited by Rado Tekku Kenkyu Kai, page 79 (1989, CMC), and Eiichiro Takiyama, "Polyester Jushi Handbook (Polyester Resin Handbook)" (1988, Nikkan Kogyo Shinbun Sha), as well as radically polymerizable or crosslinkable monomers, oligomers, and polymers known in the prior art. The added amount of the above radically polymerizable compounds is preferably 1-97 percent by weight and is more preferably 30-95 percent by weight.

Radical polymerization initiators include triazine derivatives described in Japanese Patent Publication Nos. 59-1281 and 61-9621, and Japanese Patent Publication Open to Public Inspection (hereinafter referred to as JP-A) No. 60-60104; organic peroxides described in JP-A Nos. 59-1504 and 61-243807; diazonium compounds described in Japanese Patent Publication Nos. 43-23684, 44-6413, and 47-1604, and U.S. Pat. No. 3,567,453; azide compounds described in U.S. Pat. Nos. 2,848,328, 2,852,379, and 2,940,853; orthoquinone diazides described in Japanese Patent Publication Nos. 36-22062, 37-13109, 38-18015, and 45-9610; various onium compounds described in Japanese Patent Publication No. 55-39162, JP-A No. 59-14023, and "Macromolecules", Volume 10, page 1307 (1977); azo compounds described in JP-A No. 59-142205; metal arene complexes described in JP-A No. 1-54440, European Patent Nos. 109,851 and 126,712, and J. Imaging Science Volume 30, page 174 (1986); (oxo)sulfonium organic boron complexes described in JP-A No. 4-56831 and Japanese Patent Application No. 4-89535; titanocenes described in JP-A No. 61-151197; transition metal complexes containing transition metals such as ruthenium described in "Coordination Chemistry Review" Volume 84, pages 85-277 (1988) and JP-A No. 2-182701; 2,4,5-triarylimidazole dimers and carbon tetrabromide described in JP-A No. 3-209477; as well as organic halogen compounds described in JP-A No. 59-107344. It is preferable that these polymerization initiators are incorporated in a range of 0.01-10 parts by weight with respect to 100 parts by weight of the compounds having a radically polymerizable ethylenic unsaturated bond.

In the ink of the present invention, compounds employed as a radically polymerizable compound, which undergoes actinic radiation polymerization, mainly have an ethylenic unsaturated bond, and $\pi$ electrons in the unsaturated bond exhibit weak basicity. As a result, when basic dispersing agents are employed, adsorption onto pigments becomes competitive, making it impossible to obtain stable dispersion. Consequently, it is assumed that by employing acidic dispersing agents, competitive adsorption is eliminated, whereby it is possible to obtain stable dispersion. Further, it is assumed that by employing pigments at an amine value greater than their acid value, the resulting effects are enhanced.

Other than those described above, it is possible to employ various additives in the actinic radiation curable ink of the present invention. It is possible to add, for example, surface active agents, leveling agents, matting agents, as well as polyester based resins, polyurethane based resins, vinyl based resins, acryl based resins, rubber based resins, and wax, all of which control physical properties of the layers. Further, in order to enhance storage stability of inks, it is possible to add polymerization inhibitors in an amount of 2,000-20,000 ppm. Since it is preferable that an ultraviolet radiation curable ink is ejected after heating to decrease its viscosity, in order to minimize head clogging due to thermal polymerization, it is preferable to incorporate polymerization inhibitors. Further, by combining cationically polymerizable monomers with the initiators, it is possible to prepare a radical-cation hybrid type curable ink.

Employed as recording materials usable in the present invention may be various types of non-absorptive plastics and polyethylene films thereof employed for so-called soft packaging. Listed as various types of plastic films may, for example, be polyethylene terephthalate (PET) film, oriented polystyrene (OPS) film, oriented polypropylene (OPP) film, oriented nylon (ONy) film, polyvinyl chloride (PVC) film, polyethylene (PE) film, and triacetyl cellulose (TAC) film. Employed as other plastics may be polycarbonate, acryl resins, ABS, polyacetal, PVA and various kinds of rubber. Further, various kinds of metal, as well as various kinds of glass may be acceptable as a recording material. Of these recording materials, especially in the case in which images are formed on PET film, OPS film, OPP film, ONy film, or PVC film, the embodiments of the present invention become effective. These substrates not only tend to result in curling and deformation of film due to drying and curing shrinkage and heat generation during curing reaction, but also the ink layer hardly follows the shrinkage of the substrate.

The surface energy of various types of these plastic films varies depending on characteristics of the components. Heretofore, problems have occurred in which dot diameter varies after deposition of ink depending on recording materials. However, under the constitution of the present invention, it is possible to form desired highly detailed images on a wide range of recording materials of a surface energy of 35-60 mN/m, including OPP film and OPS film of a relatively low surface energy as well as PET of a relatively high surface energy.

In the present invention, in view of cost of recording materials such as packaging cost and production cost, print production efficiency, and possibility of printing at various sizes, it is advantageous to employ long-length (rolls of) recording materials.

The image forming method will now be described.

In the image forming method of the present invention, a method is preferred in which the abovementioned ink is ejected onto a recording material employing an ink-jet recording system, imaging is performed, and subsequently, ink is exposed to actinic radiation to affect curing.

(Total Ink Layer Thickness after Ink Deposition)

In the present invention, the total ink layer thickness after curing the ink deposited on the recording material employing actinic radiation is preferably 2-26 µm. In actinic radiation curable ink-jet recording in the screen printing field, at present, the total ink layer thickness generally exceeds 25 µm. However, in the soft package printing field in which thin plastic materials are employed as a recording material, in addition to the aforesaid problems such as curling and wrinkling of recording materials, problems further occur in which the entire stiffness and quality feeling of printed matter are adversely affected. As a result, excessive ink ejection resulting in excessive thickness is not preferred.

Incidentally, as used herein, the term "total ink layer thickness" refers to the maximum value of the ink layer thickness of images formed on a recording material. Even though images are monochromatic, or are recorded employing an ink-jet recording system of two-color overlapping (secondary color), three-color overlapping, four-color overlapping (being white ink base), the resulting total ink layer thickness is meant as above.

(Ink Ejection Conditions)

In view of ejection stability, preferred ejection conditions are that a recording head and ink are heated to 100° C. and then ejected. Actinic radiation curable ink exhibits a wide range of viscosity variation due to temperature variation. The resulting viscosity variation markedly affects the liquid droplet size as well as the ejection rate of the liquid droplets to result in degradation of image quality. Therefore, it is necessary to maintain a constant elevated temperature. The control range of ink temperature is commonly ±5° C. from the specified temperature, is preferably ±2° C., and is more preferably ±1° C.

Further, in the present invention, the volume of liquid droplets ejected from each nozzle is preferably 2-20 pl. For the formation of highly detailed images, it is required that the liquid droplet volume is in the above range. In order to achieve ejection at the above volume, enhancement of the ejection stability described above is further required. The present invention makes it possible to enhance the ejection stability and to achieve stable formation of highly detailed images even through ejection of minute liquid droplets at a volume of 2-20 pl.

(Radiation Exposing Conditions after Ink Deposition)

In the image forming method of the present invention, as actinic radiation exposing conditions, the actinic radiation is exposed preferably within 0.001-1.0 second after ink deposition, and more preferably within 0.001-0.5 second. In order to form highly detailed images, it is essential that exposure occurs as soon as possible.

Disclosed as an actinic radiation exposing method is the basic method of JP-A No. 60-132767. Based on this, light sources are provided on both sides of a head unit and the head as well as the light sources are scanned employing a shuttle system. Exposure is performed a definite time after ink deposition. Further, curing is completed employing another light source which is not driven. U.S. Pat. No. 6,145,979 discloses a method in which an optical fiber is used as an exposure method as well as a method in which collimated light is directed onto the mirror surface provided on the side of a head unit and UV radiation is exposed onto a recording section. In the image forming method of the present invention, any of these exposing methods may be employed.

Further, one of the preferred embodiments is that exposure to the actinic radiation is divided into two stages in such a manner that at first, actinic radiation is exposed 0.001-2.0 seconds after ink deposition employing the aforesaid method, and again after finish of all printing, actinic radiation is further exposed. By dividing exposure to the actinic radiation into two stages, it is possible to retard shrinkage of the recording material which occurs during ink curing.

Heretofore, in UV ink-jet systems, in order to retard dot spread and bleeding, it has been common to use high illuminance light sources at an overall dissipation power of at least 1 kW·hour. However, when such light sources are employed, particularly in shrink label printing, the shrinkage of recording materials becomes excessively large, whereby it has not been possible to put the above systems into practice.

In the present invention, it is preferable to use actinic radiation of a maximum illuminance in the wavelength region of 254 nm. Even though light sources at an overall dissipation power of at least 1 kW·hour are employed, it is possible to form highly detailed images and also to control the contraction of recording materials within a practically acceptable level.

In the present invention, it is preferable that the overall dissipation power of the light source which emits actinic radiation is less than 1 kW·hour. Examples of light sources of an overall dissipation power of less than 1 kW·hour include, but are not limited to, fluorescent tubes, cold-cathode tubes, hot-cathode tubes, and LEDs.

The ink-jet recording apparatus (hereinafter referred to simply as the recording apparatus) of the present invention, will now be described.

The recording apparatus of the present invention will be described with reference to drawings, as appropriate. The recording apparatus in the drawings is one embodiment of the recording apparatus of the present invention, however the recording apparatus of the present invention is not limited to these drawings.

Figure 1:
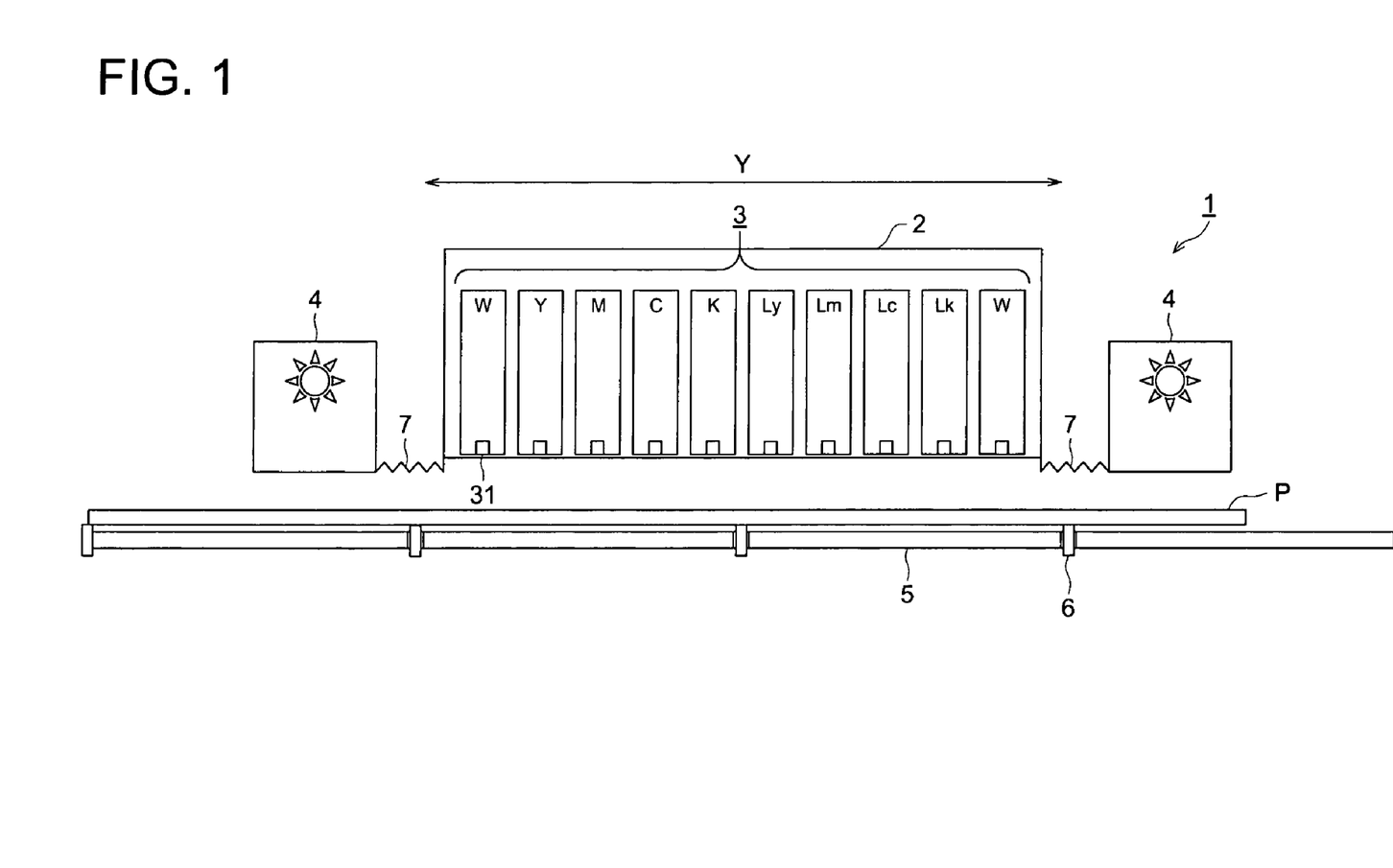
FIG. 1 is a front view showing one example of the constitution of the main section of the ink-jet recording apparatus of the present invention.

FIG. 1 is a front view showing the constitution of the main section of the recording apparatus of the present invention. Recording apparatus 1 is composed of head carriage 2, recording heads 3, exposure devices 4, and platen section 5. In aforesaid recording apparatus 1, platen section 5 is provided under recording material P. Platen section 5 exhibits an ultraviolet radiation absorbing function, and absorbs excessive ultraviolet radiation, which has been transmitted through recording material P. As a result, it is possible to achieve very stable reproduction of highly detailed images.

Recording material P is guided by guide member 6 and is conveyed backward from the front in FIG. 1, employing a conveying device (not shown). A head scanning device (also not shown) performs scanning of recording head 3 held by head carriage 2 and allows head carriage 2 to perform reciprocating motion in the Y direction in FIG. 2.

Head carriage 2 is installed above the upper side of recording material P, and houses a plurality of recording heads 3, described below, corresponding to the number of colors employed for image printing on recording material P, while the ejection outlets are arranged on the lower side. Head carriage 2 is installed in the main body of recording apparatus 1 in such a manner as to make it possible to perform reciprocating motion in the Y direction in FIG. 1 while being driven by the head scanning device.

Incidentally, FIG. 1 is drawn in such a manner that head carriage 2 houses recording heads 3 of white (W), yellow (Y), cyan (C), black (K), light yellow (Ly), light magenta (Lm), light cyan (Lc), light black (Lk), and white (W). In practice, the number of colors of recording heads 3 housed in head carriage 2 is determined as appropriately.

Recording heads 3 eject actinic radiation curable inks (for example, UV curable inks) fed by an ink feeding device (not shown) onto recording material P from the ejection outlets, employing a plurality of ejection devices provided in the interior of the device. The UV inks ejected from recording heads 3 are composed of colorants, polymerizable monomers, and initiators, and exhibit properties such that when exposed to ultraviolet radiation, curing occurs in such a manner that monomers undergo crosslinking and polymerization reaction, along with the action of initiators functioning as a catalyst.

During scanning of recording heads 3 from one edge of recording material P to the other edge in the Y direction in FIG. 1, and while driven by the head scanning device, UV inks are ejected in the form of ink droplets onto the specified region (the ink depositable region) of recording material P, and subsequently are deposited on the ink depositable region.

The above scanning is repeated for an appropriate number of times and UV inks were ejected onto the depositable region in one region. Thereafter, recording imperial P is suitably moved from the front to the depth direction in FIG. 1, employing a conveyance device. While repeating scanning employing the head scanning device, UV inks are ejected on the subsequent depositable region in the depth direction in FIG. 1 with respect to the above depositable region, employing recording heads 3.

The above operation is repeated, and UV inks are ejected from recording heads 3 while coupled with the head scanning device and the conveying device, whereby images composed of aggregates of UV ink droplets are formed on recording material P.

Exposure device 4 is composed of ultraviolet lamps which emit ultraviolet radiation at the specified wavelength region for stable exposure energy, and of filters which allow transmission of ultraviolet radiation at the specified wavelength. Herein, employed as ultraviolet radiation lamps may be mercury lamps, metal halide lamps, excimer lasers, ultraviolet radiation lasers, cold-cathode tubes, hot-cathode tubes, black-lights, and LEDs (Light Emitting Diodes). Of these, preferred are band-shaped metal halide lamps, cold-cathode tubes, hot-cathode tubes, mercury lamps, or black-lights. Particular preferred are low pressure mercury lamps emitting ultraviolet radiation at a wavelength of 254 nm, hot-cathode tubes, cold-cathode tubes, and bactericidal lamps, because these efficiently minimize bleeding and control the dot diameter. By employing black-lights as a radiation source of exposure devices 4, it is possible to produce lower cost exposure devices 4 for curing the UV ink.

Exposure devices 4 have a size which is almost the same as the maximum which can be set in recording apparatus (being a UV ink-jet printer) 1 in the depositable region which is ejected by the UV ink during one scan of recording heads 3 driven by the scanning device, or has a size larger than the depositable region.

Exposure devices 4 are fixed parallel to recording material P on both sides of the head carriage.

As a means to control illuminance of the ink ejection section, as noted above, it is natural to shield the entire recording heads 3 from light. In addition, cases are also effective in which distance h2 between ink ejection section 31 of recording heads 3 and recording material P is greater than distance h1 between exposure device 4 and recording material P (h1<h2), or distance d between recording heads 3 and exposure device 4 is increased (d is increased). Further, it is more preferable to form a bellows structure between recording heads 3 and exposure device 4.

It is possible to appropriately vary the wavelength of ultraviolet radiation emitted from exposure device 4 by changing ultraviolet lamps or filters initially provided on exposure device 4.

The ink of the present invention exhibits excellent ejection stability and is particularly useful in the case in which images are formed employing a line head type recording apparatus.

Figure 2:
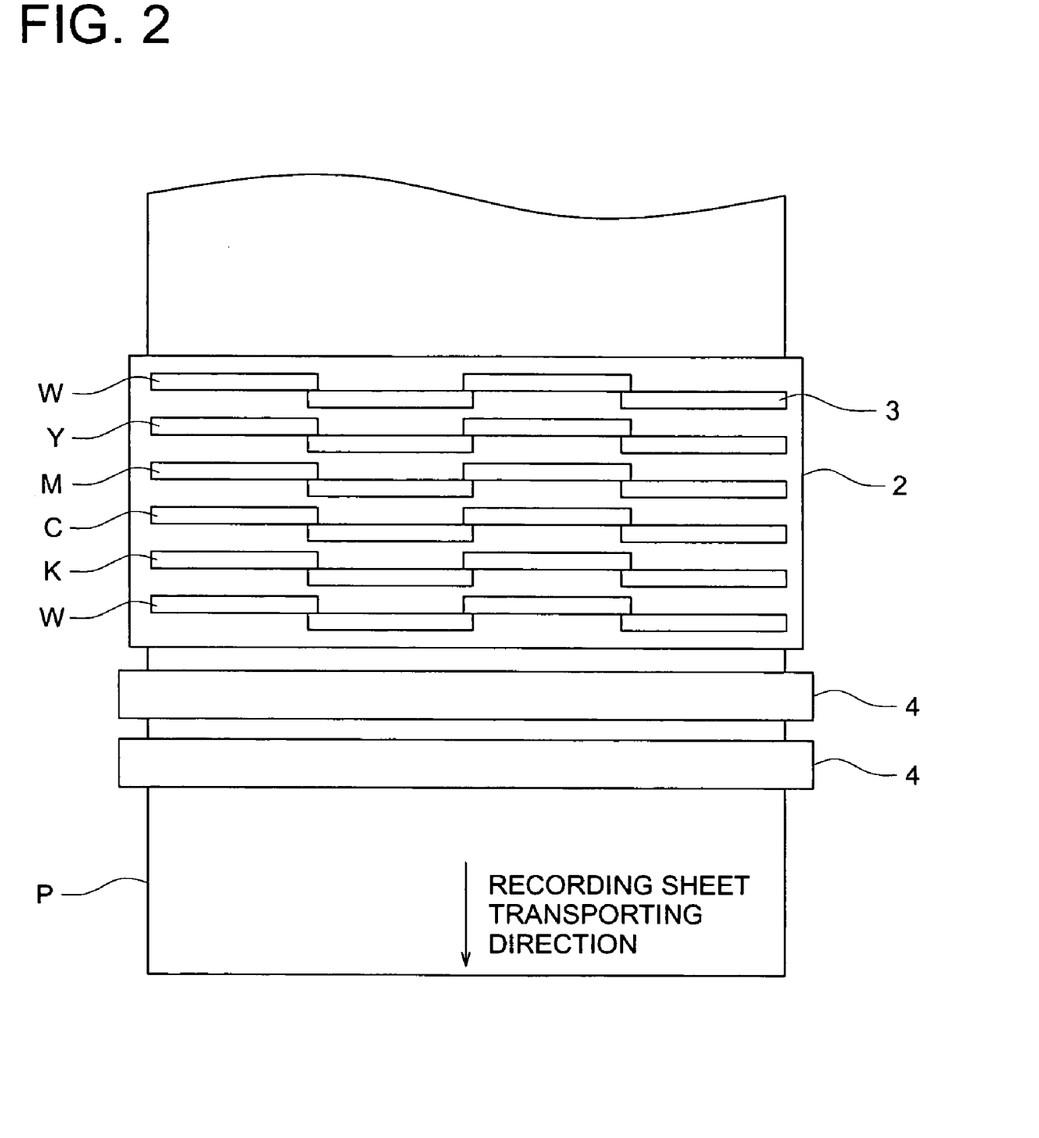
FIG. 2 is a top view showing another example of the composition of the main section of an ink-jet recording apparatus of the present invention.

FIG. 2 is a top view showing another example of the composition of the main part of an ink-jet recording apparatus.

The ink-jet recording apparatus shown in FIG. 2 is called a line head system apparatus, and a plurality of ink-jet recording heads 3 of each color is fixedly arranged to cover the entire width of recording material P.

On the other hand, on the downstream side of head carriage 2, exposure device 4 is arranged to cover the entire ink printing area, while also covering the entire width of recording material P as above. Employed as ultraviolet radiation lamps used for exposure device 4 are the same as those described in FIG. 1.

In this line head system, head carriage 2 and exposure device 4 are fixed, and only recording material P is conveyed, whereby images are formed during ink ejection and curing.

EXAMPLES

The present invention is specifically described with reference to examples, however the present invention is not limited thereto.

Example 1

<<Preparation of Pigment Dispersion>>

(Preparation of Pigment Dispersion D-1: Present Invention)

Each of the compounds described below was placed in a stainless steel beaker which was heated to 50° C. on a hot plate, and dissolution was performed while stirring over a period of three hours.

| | |
|---|---|
| PB822 (polymer dispersing agent at an acid value of 18.5 mg/g KOH and an amine value of 15.9 mg/g KOH, produced by Ajinomoto Fine Techno Co.) | 8 parts |
| Tetraethylene glycol diacrylate | 72 parts |

Subsequently, after cooling the resultant solution to room temperature, the pigment described below was added and the resultant mixture was sealed in a glass bottle together with 200 g of 1 mm diameter zirconia beads. Further, the resulting mixture was dispersed over a period of 4 hours employing a paint shaker and the zirconia beads were then removed, whereby Pigment Dispersion D-1 was prepared.

| | |
|---|---|
| Cyanine Blue 4044 (Pigment Blue 15:4 at an amine value of 8.0 mg/g KOH and an acid value of 0.0 mg/g KOH, manufactured by Sanyo Color Works, Ltd.) | 20 parts |

Incidentally, the amine value as well as the acid value of the dispersing agent and the pigment, described above, was determined employing the method described below.

Determination of the Amine Value of Dispersing Agent

A dispersing agent was dissolved in methyl isobutyl ketone, and the resultant solution was subjected to potentiometric titration employing a 0.01 mol/L perchloric acid methyl isobutyl ketone and the resulting value in terms of KOH mg/g was designated as the amine value of the dispersing agent. Potentiometric titration was performed employing an automatic titration apparatus COM-1500, manufactured by Hiranuma Sangyo Co., Ltd.

<Determination of the Acid Value of Dispersing Agent>

A dispersing agent was dissolved in methyl isobutyl ketone, and the resultant solution was subjected to potentiometric titration employing a 0.01 mol/L potassium methoxide-methyl isobutyl ketone/methanol (4:1) solution. The resulting value in terms of KOH mg/g was designated as the acid value of the dispersing agent. Potentiometric titration was performed employing an automatic titration apparatus COM-1500, manufactured by Hiranuma Sangyo Co., Ltd.

<Determination of the Amine Value of Pigment>

Added to a pigment was a 0.01 mol/L perchloric acid methyl butyl ketone solution, and the resultant mixture was subjected to ultrasonic dispersion. Thereafter, the supernatant collected by centrifugation was subjected to potentiometric titration employing a 0.01 mol/L potassium methoxide-methyl isobutyl ketone/methanol (4:1) solution. The decreased amount of perchloric acid due to the pigment was converted to KOH mg/g, and the resultant value was designated as the amine value of the pigment. Potentiometric titration was performed employing an automatic titration apparatus COM-1500, manufactured by Hiranuma Sangyo Co., Ltd.

<Determination of the Acid Value of Pigment>

Added to a pigment was a 0.01 mol/L tetrabutylammonium hydroxide-methyl butyl ketone solution, and the resultant mixture was subjected to ultrasonic dispersion. Thereafter, the supernatant collected by centrifugation was subjected to potentiometric titration employing a 0.01 mol/L perchloric acid methyl isobutyl ketone solution. The decreased amount of 0.01 mol/L tetrabutylammonium hydroxide due to the pigment was converted to KOH mg/g, and the resultant value was designated as the acid value of the pigment. Potentiometric titration was performed employing an automatic titration apparatus COM-1500, manufactured by Hiranuma Sangyo Co., Ltd.

(Preparation of Pigment Dispersion D-2: Present Invention)

Each of the compounds described below was placed in a stainless steel beaker which was heated to 50° C. on a hot plate, and dissolution was performed while stirring over a period of one hour.

| | |
|---|---|
| PB821 (polymer dispersing agent at an acid value of 30.4 mg/g KOH and an amine value of 10.2 mg/g KOH, produced by Ajinomoto Fine Techno Co.) | 9 parts |
| Tetraethylene glycol diacrylate | 71 parts |

Subsequently, after allowing the resultant solution to cool to room temperature, the pigment described below was added and the resultant mixture was sealed in a glass bottle together with 200 g of 1 mm diameter zirconia beads. Further, the resulting mixture was dispersed over a period of 4 hours employing a paint shaker, and the zirconia beads were then removed, whereby Pigment Dispersion D-2 was prepared.

| | |
|---|---|
| Pigment Yellow 138 at a regulated amine value of 5.8 mg/g KOH and a regulated acid value of 2.6 mg/g KOH | 20 parts |

(Preparation of Pigment Dispersion D-3: Present Invention)

Each of the compounds described below was placed in a stainless steel beaker which was heated to 50° C. on a hot plate, and dissolution was performed while stirring over a period of one hour.

| | |
|---|---|
| PB822 (polymer dispersing agent at an acid value of 18.5 mg/g KOH and an amine value of 15.9 mg/g KOH, produced by Ajinomoto Fine Techno Co.) | 10 parts |
| Tetraethylene glycol diacrylate | 70 parts |

Subsequently, after allowing the resultant solution to cool to room temperature, the pigment described below was added and the resultant mixture was sealed in a glass bottle together with 200 g of 1 mm diameter zirconia beads. Further, the resulting mixture was dispersed over a period of 4 hours employing a paint shaker, and the zirconia beads were then removed, whereby Pigment Dispersion D-3 was prepared.

| | |
|---|---|
| Pigment Red 122 at a regulated an amine value of 6.1 mg/g KOH and a regulated acid value of 4.1 mg/g KOH | 20 parts |

(Preparation of Pigment Dispersion D-6: Comparative Example)

Each of the compounds described below was placed in a stainless steel beaker which was heated to 50° C. on a hot plate, and dissolution was performed while stirring over a period of one hour.

| | |
|---|---|
| Disparon ED-251 (polymer dispersing agent at an acid value of 19 mg/g KOH and an amine value of 13.4 mg/g KOH, produced by Kusumoto Chemicals, Ltd.) | 10 parts |
| Tetraethylene glycol diacrylate | 70 parts |

Subsequently, after allowing the resultant solution to cool to room temperature, the pigment described below was added and the resultant mixture was sealed in a glass bottle together with 200 g of 1 mm diameter zirconia beads. Further, the resulting mixture was dispersed over a period of 4 hours employing a paint shaker, and the zirconia beads were then removed, whereby Pigment Dispersion D-4 was prepared.

| | |
|---|---|
| Pigment Yellow 138 at a regulated amine value of 2.2 mg/g KOH and a regulated acid value of 2.1 mg/g KOH | 20 parts |

(Preparation of Pigment Dispersion D-5: Present Invention)

Each of the compounds described below was placed in a stainless steel beaker which was heated to 50° C. on a hot plate, and dissolution was performed while stirring over a period of one hour.

| | |
|---|---|
| PB821 (polymer dispersing agent at an acid value of 30.4 mg/g KOH and an amine value of 10.2 mg/g KOH, produced by Ajinomoto Fine Techno Co.) | 8 parts |
| Tetraethylene glycol diacrylate | 72 parts |

Subsequently, after allowing the resultant solution to cool to room temperature, the pigment described below was added and the resultant mixture was sealed in a glass bottle together with 200 g of 1 mm diameter zirconia beads. Further, the resulting mixture was dispersed over a period of 4 hours employing a paint shaker, and the zirconia beads were then removed, whereby Pigment Dispersion D-5 was prepared.

| | |
|---|---|
| Paliotol Yellow D0960 (Pigment Yellow 138 at an amine value of 0.2 mg/g KOH and an acid value of 1.3 mg/g KOH, produced by BASF AG) | 20 parts |

(Preparation of Pigment Dispersion D-6: Comparative Example)

Each of the compounds described below was placed in a stainless steel beaker which was heated to 50° C. on a hot plate, and dissolution was performed while stirring over a period of one hour.

| | |
|---|---|
| Disperbyk 161 (polymer dispersing agent at an acid value of 4.4 mg/g KOH and an amine value of 10.9 mg/g KOH, produced by BYK Chemie Co.) | 8 parts |
| Tetraethylene glycol diacrylate | 72 parts |

Subsequently, after allowing the resultant solution to cool to room temperature, the pigment described below was added and the resultant mixture was sealed in a glass bottle together with 200 g of 1 mm diameter zirconia beads. Further, the resulting mixture was dispersed over a period of 4 hours employing a paint shaker, and the zirconia beads were then removed, whereby Pigment Dispersion D-3 was prepared.

| | |
|---|---|
| Pigment Yellow 138 at a regulated amine value of 2.6 mg/g KOH and a regulated acid value of 2.6 mg/g KOH | 20 parts |

(Preparation of Pigment Dispersion D-7: Comparative Example)

Each of the compounds described below was placed in a stainless steel beaker which was heated to 50° C. on a hot plate, and dissolution was performed while stirring over a period of one hour.

| | |
|---|---|
| Solsperse 3200 (polymer dispersing agent at an acid value of 24.8 mg/g KOH and an amine value of 27.1 mg/g KOH, produced by Avecia Limited) | 8 parts |
| Tetraethylene glycol diacrylate | 72 parts |

Subsequently, after allowing the resultant solution to cool to room temperature, the pigment described below was added and the resultant mixture was sealed in a glass bottle together with 200 g of 1 mm diameter zirconia beads. Further, the resulting mixture was dispersed over a period of 4 hours employing a paint shaker, and the zirconia beads were then removed, whereby Pigment Dispersion D-7 was prepared.

| | |
|---|---|
| Pigment Red 122 at a regulated amine value of 6.1 mg/g KOH and a regulated acid value of 4.1 mg/g KOH | 20 parts |

<<Preparation of Inks>>

Each of the additives listed in Table 1 was successively added to each of the pigment dispersions prepared as above, whereby Inks 1-13 were prepared. Incidentally, the numeric values, described in Table 1, are in percent by weight.

Each of the additives represented by abbreviation in Table 1 is detailed as follows.

Initiators (Radically Polymerizable Compounds)

*1: tetraethylene glycol diacrylate

*2: ε-caprolactum modified dipentaerythritol hexaacrylate

*3: phenoxyethyl methacrylate (Polymerization Initiator)

I-907; Irugacure 907 (produced by Japan Ciba-Geigy Co.)

(Surface Active Agent)

F-475: Megafax F475 perfluoroalkyl group-containing acryloligomer (Dainippon Ink and Chemicals, Incorporated)

<<Ink Evaluation>>

(Evaluation of Storage Stability of Inks)

Each of Inks 1-13, prepared as above, was placed in a glass bottle and sealed. Thereafter, each of the glass bottles was allowed to stand at 60° C. for three days. Subsequently, the sedimentation state of the pigment was visually observed and evaluated based on the criteria below.

A: no sedimentation of the pigment was noted

B: no sedimentation was noted, but when the liquid composition was vigorously shaken, aggregates of pigment particles were noted on the wall of the glass bottle C: sedimentations were clearly noted on the bottom of the glass bottle <<Ink-jet Image Forming and Evaluation>>

(Image Forming Method-1)

By employing the ink-jet recording apparatus provided with piezo type ink-jet nozzles shown in Table 1, which was loaded with each of the inks prepared as above, solid images were continuously recorded on a 600 mm wide and 500 m length recording material (being a polyethylene terephthalate film) under the conditions described below. The ink feeding system was composed of an ink tank, a feeding pipe, a pre-chamber ink tank directly prior to the heads, piping fitted with filters, and piezo heads. The section from the pre-chamber tank to the heads was isolated from heat and heated to 50° C. The piezo heads housing 256 nozzles were driven to enable ejection of multi-sized dots at a volume of 2-20 μl to achieve a resolution of 720×720 dpi (dpi, as described herein, represents the number of dots per 2.54 cm). After ink deposition, exposure was performed under B: a slight difference in the deposition positions was noted between the initial carriage conveyance and the return carriage conveyance C: some difference in the deposition positions was noted between the initial carriage conveyance and the return carriage conveyance, and the returning carriage conveyance was slightly delayed D: an obvious difference in the deposition positions was noted between the initial carriage conveyance and the return carriage conveyance Table 1 shows the results.

TABLE 1

| Ink No. | Pigment Dispersion Added Number | Pigment Dispersion Added Amount | Radically Polymerizable Compound *1 | Radically Polymerizable Compound *2 | Radically Polymerizable Compound *3 | Polymerization Initiator I-907 | Surface Active Agent F475 | Individual Evaluation Storage Stability of Ink | Individual Evaluation Ejection Stability 1 | Remarks |
|---|---|---|---|---|---|---|---|---|---|---|
| 1 | D-1 | 12.00 | 32.50 | 25.00 | 25.00 | 5.00 | 0.50 | A | A | Inv. |
| 2 | D-1 | 14.00 | 31.00 | 30.00 | 20.00 | 5.00 | — | A | A | Inv. |
| 3 | D-1 | 12.00 | 32.40 | 20.00 | 30.00 | 5.00 | 0.60 | A | A | Inv. |
| 4 | D-2 | 16.00 | 29.50 | 20.00 | 30.00 | 4.00 | 0.50 | A | A | Inv. |
| 5 | D-2 | 18.00 | 21.30 | 20.00 | 35.00 | 5.00 | 0.70 | A | A | Inv. |
| 6 | D-3 | 12.00 | 29.00 | 25.00 | 30.00 | 3.50 | 0.50 | A | A | Inv. |
| 7 | D-3 | 15.00 | 35.60 | 19.50 | 24.00 | 5.50 | 0.40 | A | A | Inv. |
| 8 | D-3 | 13.50 | 27.00 | 19.00 | 35.00 | 5.00 | 0.50 | A | A | Inv. |
| 9 | D-4 | 15.50 | 30.20 | 29.00 | 20.00 | 4.80 | 0.50 | A | B | Inv. |
| 10 | D-5 | 13.00 | 39.00 | 20.00 | 22.50 | 5.00 | 0.50 | A | B | Inv. |
| 11 | D-5 | 13.00 | 41.50 | 30.00 | 10.00 | 5.00 | 0.50 | A | B | Inv. |
| 12 | D-6 | 11.00 | 18.50 | 30.00 | 35.00 | 5.00 | 0.50 | C | D | Comp. |
| 13 | D-7 | 12.00 | 37.50 | 25.00 | 20.00 | 5.00 | 0.50 | C | D | Comp. |

Inv.: Present Invention
Comp.: Comparative Example conditions of a maximum illuminance of 8 mW/cm² and an exposure energy of 20 mJ/cm², employing fluorescent lamps (specially ordered products, produced by Nippo Electric Co., Ltd.) of the lamp units located on both sides of the carriage, whereby curing was performed. The above image recording was carried out at an ambience of 25° C. and 30 percent relative humidity.

(Ink-jet Image Recording: Evaluation of Ejection Stability 1)

By employing the above ink-jet apparatus, interactive printing was performed at a carriage travel rate of 400 mm/second. Ejection was continuously performed to the position at 500 mm (100 mm from the left edge) from the right edge of the recording material, and the recording material was conveyed by the head width. Thereafter, when the carriage returned, ejection was continuously preformed to the position at 100 mm from the left edge. Time from passing the position at 500 mm from the right edge of the recording material to passing the position at 100 mm from the left edge of the recording material, after the carriage returned, was set to reach 4 seconds. Rate fluctuation during intermittent ejection was evaluated by observing overlapping of the end of printing by the initial carriage conveyance at the start of printing by the returning carriage, and Ejection Stability 1 was evaluated based on the criteria below.

A: no difference in the deposition positions was noted between the initial carriage conveyance and the return carriage conveyance As can clearly be seen from the results listed in Table 1, inks prepared by employing the pigment dispersion of the present invention, which contained radically polymerizable compounds as a photopolymerizable compound, as well as the pigment dispersing agent at an acid value greater than its amine value, or the pigment dispersion of the present invention, which employed the pigment at an amine value greater than its acid value, exhibited excellent storage stability of the ink as well as excellent ejection stability during image formation, compared to Comparative Examples.

Example 2

<<Preparation of Ink>>

Each of the additives listed in Table 2 was successively added to each of Dispersions D-1-D-7, whereby Inks 21-31 were prepared. Numeric values described in Table 2 are percent by weight.

<<Evaluation of Inks>>

(Evaluation of Storage Stability of Inks)

The storage stability of inks was evaluated in the same manner as the ink evaluation described for Example 1.

<<Ink-jet Image Recording and Evaluation>>

(Image Forming Method-2)

Images were formed employing Inks 21-33 prepared as above in the same manner as Image Forming Method-1 described in Example 1, except that the ink-jet recording apparatus described in FIG. 1 was replaced with the ink-jet recording apparatus using the line head recording system described in FIG. 2.

(Ink-jet Image Recording: Evaluation of Ejection Stability 2)

Printing was performed at a conveyance rate of recording materials of 200 mm/second, employing the above ink-jet recording apparatus using the line head recording system. Of 256 nozzles, continuous ejection was performed from the edge of the recording material to 100 mm, employing nozzles 1-128, thereafter, ejection was terminated, and continuous ejection was repeated from 1,000 mm, while continuous ejection was performed from the edge of the recording material to 900 mm, employing nozzles 129-256, thereafter, ejection was terminated, and ejection was repeated from 1,000 mm.

Any discrepancy between the edge of the image formed employing nozzles 1-128 at 1,000 mm from the edge of the recording material and the edge of the image formed employing nozzles 129-256 at 1,000 mm from the edge of the recording material was observed and fluctuation of the rate during intermittent ejection was evaluated. Ejection Stability 2 was evaluated based on the criteria below.

A: no difference in the deposition positions was noted between the image formed employing nozzles 1-128 and the image formed employing nozzles 129-256

B: a slight difference in the deposition positions was noted between the image formed employing nozzles 1-128 and the image formed employing nozzles 129-256

C: a definite difference in the deposition positions was Noted between the image formed employing nozzles 1-128 and the image formed employing nozzles 129-256, and the deposition position by nozzles 1-128 was delayed to some extent D: an obvious difference was noted between the image formed employing nozzles 1-128 and the image formed by nozzles 129-256 which were constituted employing the pigment dispersion of the present invention containing radically polymerizable compounds as a photopolymerizable compound, as well as pigment dispersing agents at an acid value greater than their amine value, or pigments at an amine value greater than their acid value, exhibited excellent storage stability as well as excellent ejection stability.

What is claimed is:

1. A photocurable ink for ink-jet printing, comprising:
   a photopolymerizable compound;
   a pigment; and
   a dispersing agent,
   wherein the photopolymerizable compound is a radical polymerizable compound;
   an amine value of the pigment(AMp) is larger than an acid value of the pigment(ACp); and
   an acid value of the dispersing agent(ACd) is larger than an amine value of the dispersing agent(AMd).

2. The photocurable ink for ink-jet printing of claim 1, wherein the amine value of the pigment(AMp), the acid value of the pigment(ACp), the acid value of the dispersing agent(ACd) and the amine value of the dispersing agent(AMd) satisfy the following relationship:

$1 \leq AMp - ACp < 10$; and $1 \leq ACd - AMd < 30$.

3. The photocurable ink for ink-jet printing of claim 1, wherein an amount of the dispersing agent comprised in the photocurable ink is 20 to 80 weight % based on the total weight of the pigment.

4. The photocurable ink for ink-jet printing of claim 2, wherein an amount of the dispersing agent comprised in the photocurable ink is 20 to 80 weight % based on the total weight of the pigment.

TABLE 2

| | Ink Composition (weight percent) | | | | | | | | |
|---|---|---|---|---|---|---|---|---|---|
| | Pigment Dispersion | Radically Polymerizable Compound | | | Polymerization Initiator | Surface Active Agent | Individual Evaluation Result | | |
| Ink No. | Number | Added Amount | *1 | *2 | *3 | I-907 | F475 | Ink Storage Stability | Ejection Stability 2 | Remarks |
| 21 | D-1 | 14.00 | 42.98 | 18.00 | 20.00 | 5.00 | 0.02 | A | A | Inv. |
| 22 | D-1 | 13.00 | 21.98 | 30.00 | 30.00 | 5.00 | 0.02 | A | A | Inv. |
| 23 | D-1 | 13.50 | 44.99 | — | 38.00 | 3.50 | 0.01 | A | A | Inv. |
| 24 | D-2 | 15.50 | 21.60 | 28.00 | 30.00 | 4.90 | — | A | A | Inv. |
| 25 | D-2 | 16.50 | 32.87 | 25.00 | 20.00 | 5.60 | 0.03 | A | A | Inv. |
| 26 | D-3 | 11.50 | 53.48 | 15.00 | 15.00 | 5.00 | 0.02 | A | A | Inv. |
| 27 | D-3 | 13.00 | 31.97 | 33.00 | 18.00 | 4.00 | 0.03 | A | A | Inv. |
| 28 | D-4 | 12.00 | 32.58 | 18.00 | 33.00 | 4.40 | 0.02 | A | B | Inv. |
| 29 | D-5 | 14.90 | 46.19 | 30.00 | 5.00 | 3.90 | 0.01 | A | B | Inv. |
| 30 | D-6 | 12.00 | 42.90 | 19.60 | 20.00 | 5.50 | — | C | D | Comp. |
| 31 | D-7 | 13.00 | 36.98 | 10.00 | 35.00 | 5.00 | 0.02 | C | D | Comp. |

Inv.: Present Invention
Comp.: Comparative Example

As can clearly be seen from the results described in Table 2, even in the case in which images are formed employing the ink-jet recording apparatus using the line head recording system, in the same manner as the results of Example 1, inks 5. A method of forming an image comprising the steps of:
   jetting droplets of the photocurable ink of claim 1 from a plurality of nozzles of an ink-jet head onto a recording material; and irradiating the jetted droplets of the photocurable ink on the recording material with active rays so as to harden the photocurable ink,
wherein the irradiating step is carried out within 0.001 and 1.0 second after arrival of the droplets of the photocurable ink onto the recording media.

6. A method of forming an image comprising the steps of:
jetting droplets of the photocurable ink of claim 1 from a plurality of nozzles of an ink-jet head onto a recording material; and
irradiating the jetted droplets of the photocurable ink on the recording material with active rays so as to harden the photocurable ink,
wherein a thickness of the hardened ink is from 2 to 25 µm.

7. A method of forming an image comprising the steps of:
jetting droplets of the photocurable ink of claim 1 from a plurality of nozzles of an ink-jet head onto a recording material; and
irradiating the jetted droplets of the photocurable ink on the recording material with active rays so as to harden the photocurable ink,
wherein the ink-jet head is a line head.

8. An apparatus for ink-jet recording using the method of claim 5, comprising an ink-jet head having a plurality of nozzles for jetting a photocurable ink onto a recording material, wherein the ink and the ink-jet head are heated at 35 to 100° C. prior to carrying out the jetting step.

* * * * *